(12) United States Patent
Cheon et al.

(10) Patent No.: US 11,115,182 B2
(45) Date of Patent: Sep. 7, 2021

(54) APPARATUS FOR APPROXIMATELY PROCESSING ENCRYPTED MESSAGES AND METHODS THEREOF

(71) Applicant: Crypto Lab Inc., Seoul (KR)

(72) Inventors: Jung Hee Cheon, Seoul (KR); Yongsoo Song, Seoul (KR); Andrey Kim, Seoul (KR); Miran Kim, Seoul (KR); Kyoohyung Han, Seoul (KR)

(73) Assignee: Crypto Lab Inc., Seoul (KR)

( * ) Notice: Subject to any disclaimer, the term of this patent is extended or adjusted under 35 U.S.C. 154(b) by 325 days.

(21) Appl. No.: 16/270,228

(22) Filed: Feb. 7, 2019

(65) Prior Publication Data

US 2020/0036511 A1 Jan. 30, 2020

(30) Foreign Application Priority Data

Jul. 27, 2018 (KR) ........................ 10-2018-0087928

(51) Int. Cl.
| | | |
|---|---|---|
| *H04L 9/00* | (2006.01) | |
| *G06F 17/17* | (2006.01) | |
| *H04L 29/06* | (2006.01) | |
| *H04L 9/06* | (2006.01) | |

(52) U.S. Cl.
CPC .............. *H04L 9/008* (2013.01); *G06F 17/17* (2013.01); *H04L 9/0618* (2013.01); *H04L 63/0428* (2013.01)

(58) Field of Classification Search
CPC ... H04L 9/008; H04L 63/0428; H04L 9/0618; H04L 2209/12; G06F 17/17
See application file for complete search history.

(56) References Cited

U.S. PATENT DOCUMENTS

| 8,630,422 B2 | 1/2014 | Gentry | |
|---|---|---|---|
| 9,083,526 B2 | 7/2015 | Gentry | |
| 2013/0216044 A1* | 8/2013 | Gentry | .................... H04L 9/008 380/277 |
| 2014/0086361 A1* | 3/2014 | Azadet | ................ H04L 25/4917 375/297 |

(Continued)

FOREIGN PATENT DOCUMENTS

| JP | 2019046460 A | 3/2019 |
|---|---|---|
| KR | 10-2014-0095179 A | 8/2014 |
| KR | 10-1475747 B1 | 12/2014 |
| KR | 10-2018-0013064 A | 2/2018 |
| KR | 10-1965628 B1 | 4/2019 |
| KR | 10-1971215 B1 | 4/2019 |

OTHER PUBLICATIONS

Jin Su Kim et al., "Problem of Decryption of Random Linear Code and Cryptological Application Thereof"; Journal of Communications and Networks (Information and Communication); Book No. 32. Chapter 6, pp. 30-38; May 2015 (12 pages).

*Primary Examiner* — Meng Li
(74) *Attorney, Agent, or Firm* — Osha Bergman Watanabe & Burton LLP (57) ABSTRACT

An operation apparatus and method for processing a homomorphic encrypted message are disclosed. The method includes producing an approximate polynomial corresponding to an operation function to be applied to a homomorphic encrypted message and approximately operating the homomorphic encrypted message using the approximate polynomial. Thus, an encrypted message may be efficiently processed.

8 Claims, 6 Drawing Sheets

(56) References Cited

U.S. PATENT DOCUMENTS

| | | | |
|---|---|---|---|
| 2016/0350648 A1* | 12/2016 | Gilad-Bachrach ... | G06N 3/0481 |
| 2017/0083287 A1* | 3/2017 | Yu ........................ | G06F 7/5525 |
| 2017/0293913 A1 | 10/2017 | Gulak et al. | |
| 2018/0096248 A1 | 4/2018 | Chabanne et al. | |
| 2019/0140818 A1* | 5/2019 | Bent ................... | H04L 63/0428 |
| 2019/0334694 A1* | 10/2019 | Chen .................... | H04L 9/0631 |

OTHER PUBLICATIONS

International Search Report issued in corresponding International Application No. PCT/KR2019/001486 dated May 8, 2019 (8 pages).

Written Opinion of the International Searching Authority issued in corresponding International Application No. PCT/KR2019/001486 dated May 8, 2019 (8 pages).

Shai Halevi et al., "Bootstrapping for HElib"; Advances in Cryptology; Sofia, Bulgaria; Jan. 30, 2015 (28 pages).

Wu et al., "Privacy-preserving Logistic Regression Analysis for Vertically Partitioned Data"; The 28th Annual Conference of the Japanese Society for Artificial Intelligence; 2014 (4 pages).

Takada et al., "Secure Approximation Guarantee for Private Empirical Risk Minimization with Homomorphic Encryption"; The Institute of Electronic, Information and Communication Engineers; IEICE Technical Report IBISML2015-86(Nov. 2015); pp. 249-256; 2015 (9 pages).

Cheon, Jung Hee; et al.; "Bootstrapping for Approximate Homomorphic Encryption;" Seoul National University, Seoul, Republic of Korea; Feb. 7, 2018; pp. 1-21 (21 pages).

Nielsen, Jesper Buus; et al.; "Advances in Cryptology—EUROCRYPT 2018;" 37th Annual International Conference on the Theory and Applications of Cryptographic Techniques; Tel Aviv, Israel; Apr. 29, 2018-May 3, 2018; Proceedings, Part 1; pp. 360-384 (639 pages).

Theon, Jung Flee; et al.; "Bootstrapping Approximate Homomorphic Encryption;" Seoul National University; University of Southern California, San Diego; 2018 (38 pages).

* cited by examiner

APPARATUS FOR APPROXIMATELY PROCESSING ENCRYPTED MESSAGES AND METHODS THEREOF

CROSS-REFERENCE TO RELATED APPLICATIONS

This application is based on and claims priority under 35 U.S.C. 119 to Korean Patent Application No. 10-2018-0087928, filed on Jul. 27, 2018, in the Korean Intellectual Property Office, the disclosures of which are herein incorporated by reference in their entireties.

BACKGROUND

Field of the Invention

Apparatuses and methods consistent with the disclosure relate to an apparatus for approximately processing encrypted messages efficiently and methods thereof.

Description of the Related Art

As communication technologies have been advanced and electronic devices have become prevalent, there have been continuous efforts to maintain security of communication between electronic devices. In line with this, encryption/decryption techniques have been used in most communication environments.

When a message encrypted by the encryption technique is transmitted to a counterpart, the counterpart must perform decryption to use the message. In this case, resource and time are wasted in the process of decrypting the encrypted data. In addition, if the message, in a state of being temporarily decrypted by the counterpart for an operation (i.e., processing, calculation, or arithmetic operation), is hacked by a third party, the message may be easily leaked out to the third party.

A homomorphic encryption method has been studied to solve the problem. According to the homomorphic encryption, although encrypted information is not decrypted and an encrypted message itself is processed, the same result as the encrypted value may be obtained after processing plain text. Therefore, various operations may be performed without decrypting the encrypted message.

However, if the homomorphic encrypted message is repeatedly used in an operation several times, a plain text area in the encrypted message becomes insufficient, and the operation may no longer be performed. Thus, the necessity for an effective data processing method has emerged.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a method and apparatus for performing an efficient approximate operation and approximate decryption on a homomorphic encrypted message.

According to an aspect of the disclosure, a method for processing a homomorphic encrypted message includes: producing an approximate polynomial corresponding to an operation function to be applied to a homomorphic encrypted message; and approximately operating the homomorphic encrypted message using the approximate polynomial.

In the producing of the approximate polynomial, when the operation function is a complex function, the approximate polynomial may be produced such that an absolute value of a difference from the operation function is equal to or smaller than a threshold value.

The method may further include: when a follow-up operation is performed on an operation result encrypted message acquired by the approximate operation and the weight of an approximate message in the operation result encrypted message exceeds a threshold value, extending a plaintext space of the operation result encrypted message.

In the extending of the plaintext space, the plaintext space may be extended by applying a function defined to obtain a quotient by dividing an encrypted input value by a predetermined threshold encrypted message modulus and eliminating the quotient, to the operation result encrypted message.

The threshold value may be set to a value less than a limit value for early rebooting, and the limit value may have a size of the plaintext space in which a follow-up operation on the operation result encrypted message is not possible.

The method may further include: providing additional information to be used for decryption of the operation result encryption message. Here, the additional information may include a scaling factor and a modulus value of the operation result encryption message.

According to another aspect of the disclosure, a computing device includes an interface configured to receive homomorphic encrypted messages, a memory configured to store the homomorphic encrypted messages, and a processor configured to produce an approximate polynomial corresponding to an operation function to be applied to the homomorphic encrypted messages and approximately operate the homomorphic encrypted messages using the approximate polynomial.

When the operation function is a complex function, the processor may set the approximate polynomial such that an absolute value of a difference between the approximate polynomial and the operation function is equal to or smaller than a threshold value, and perform the approximate operation to extend a plaintext space in an operation result encrypted message acquired by the approximate operation.

When a follow-up operation is performed on the operation result encrypted message acquired by the approximate operation and the weight of the approximate message in the operation result encrypted message exceeds a threshold value, the processor may extend a plaintext space of the operation result encrypted message.

The threshold value may be set to a value less than a limit value for early rebooting and stored in the memory, and the limit value may have a size of the plaintext space in which a follow-up operation on the operation result encrypted message is not possible.

Also, the processor may store additional information to be used for decryption of the operation result encryption message in the memory, and the additional information may include a scaling factor and a modulus value of the operation result encryption message.

According to the diverse embodiments of the disclosure, efficient approximate operation and approximate decryption may be performed on a homomorphic encrypted message.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the disclosure will be more apparent by describing certain embodiments of the disclosure with reference to the accompanying drawings, in which.

DETAILED DESCRIPTION OF THE EMBODIMENTS

Hereinafter, the disclosure will be described in detail with reference to the accompanying drawings. Encryption/decryption may be applied to an information (data) transmission process performed in the present specification, and expressions for describing the information (data) transmission process in the present specification and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector.

The mathematical operation and computation of each step of the disclosure described hereinafter may be realized by a computer operation by a coding method known for corresponding operation or calculation and/or coding devised suitably for the disclosure.

Specific formulas described hereinafter are exemplarily described among various possible alternatives, and the scope of the disclosure should not be construed as being limited to the formulas mentioned herein.

Hereinafter, various embodiments of the disclosure will be described in detail with reference to the accompanying drawings.

Figure 1:
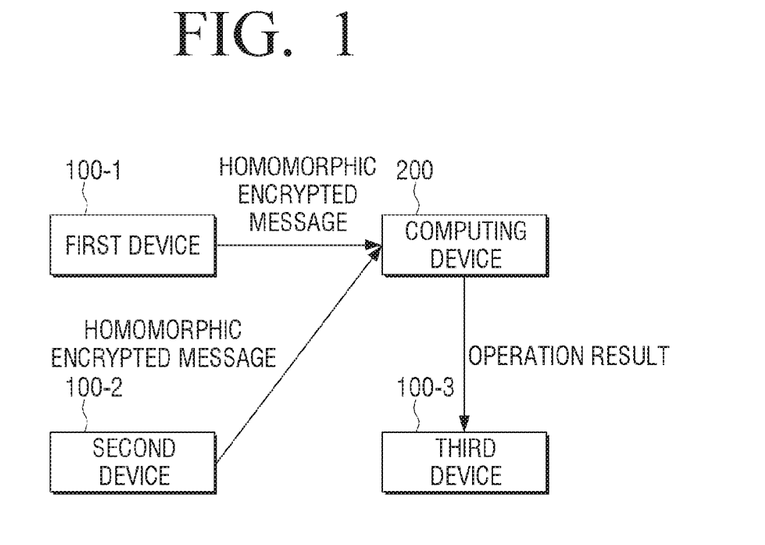
FIG. 1 is a block diagram of a data processing system according to an embodiment of the disclosure.

FIG. 1 is a block diagram of a data processing system according to an embodiment of the disclosure. Referring to FIG. 1, the data processing system includes a plurality of devices 100-1 to 100-3 and a computing device 200. Although FIG. 1 illustrates three devices, this may vary depending on examples. For example, the data processing system may be realized by one device or three or more devices.

Each of the devices 100-1 to 100-3 and the computing device 200 may be realized by various types of devices such as a mobile phone, a tablet, a game player, a PC, a laptop PC, a home server, a kiosk, and the like, and may also be realized as a home appliance to which an IoT function is applied.

A first device 100-1 and a second device 100-2 perform homomorphic encryption and provide a homomorphic encrypted message which is a result value to the computing device 200. Here, the homomorphic encrypted message refers to a homomorphic encrypted message for an approximate message including an error.

Specifically, the homomorphic encrypted message generated by the first and second devices 100-1 and 100-2 may be generated in the form that a result value including a message and an error value is restored when decrypted using a secret key later. Hereinafter, in this specification, the message including an error will be referred to as an approximate message.

When a message to be transmitted is input, the first and second devices 100-1 and 100-2 generate a homomorphic encrypted message for an approximate message including an error.

For example, the first and second devices 100-1 and 100-2 may each generate an approximate message by including an error generated by itself in a message. Specifically, when a message M to be transmitted is input, the first and second devices 100-1 and 100-2 each randomly generates a certain polynomial c1, generates a small error e, and then calculates $c0 = -c1*s+M+e \pmod{q}$ to generate a homomorphic encrypted message $E(m,s) = ct = (c0, c1)$. When the homomorphic encrypted message $E(m,s) = ct = (c0, c1)$ is decrypted later, it may be $Dec(ct) = M + e \pmod{q}$.

In another example, an error may be added when the first and second devices 100-1 and 100-2 each encrypt a message to form an approximate message. Specifically, the homomorphic encrypted message generated by each of the first and second devices 100-1 and 100-2 is generated in a form that satisfies the following properties when decrypted using a secret key.

$$Dec(ct, sk) = \langle ct, sk \rangle = M + e \pmod{q} \quad \text{[Equation 1]}$$

Here, $\langle, \rangle$ denotes a usual inner product, ct denotes an encrypted message, sk denotes a secret key, M denotes a plaintext message, e denotes an encryption error value, and q denotes a modulus of an encrypted message.

The computing device 200 performs an operation on the received homomorphic encrypted messages. The types of operations may be set in various ways. Due to the nature of the homomorphic encrypted message, the computing device 200 may perform an operation in a state in which decryption is not performed, and a result value is also in the form of an encrypted message. In this specification, the result value obtained by the operation is referred to as an operation result encrypted message. The computing device 200 transmits the operation result encrypted message to the third device 100-3. The third device 100-3 may decrypt the received operation result encrypted message to acquire an operation result value of data included in each homomorphic encrypted message.

FIG. 1 illustrates the case that the first and second devices perform encryption and the third device performs decryption, but the disclosure is not limited thereto. For example, the computing device 100 may provide the operation result value to at least one of the first and second devices. Further, one of the devices, e.g., the first device 100-1, may perform encryption twice, and provide two homomorphic encrypted message.

The computing device 200 may perform an operation several times according to a user request. In this case, the weight of the approximate message in the operation result encrypted message obtained at each operation is different. When the weight of the approximate message exceeds a threshold value, the computing device 200 performs an operation of extending a plaintext space in the operation result encrypted message.

The computing device 200 may extend the plaintext space by applying a function defined by obtaining a quotient by dividing an encrypted input value by a predetermined threshold encrypted message modulus and eliminating the quotient to the operation result encrypted message.

Specifically, if q is smaller than M in Equation 1, M+e (mod q) has a different value from M+e, so decoding is impossible. Therefore, the value q must always be maintained to be greater than M. However, as the operation proceeds, the value q gradually decreases. Extension of the plaintext space refers to changing the encrypted message ct into an encrypted message with a larger modulus. The operation of extending the plaintext space may be called rebooting otherwise. As rebooting is performed, the encrypted message may be operable again.

FIG. 1 illustrates that the first and second devices 100-1 and 100-2 generate the homomorphic encrypted message for an approximate message including an error and provide the message to the computing device 200, but the disclosure is not limited thereto. For example, the computing device 200 may receive a homomorphic encrypted message for the message itself rather than the approximate message.

In addition, the computing device 200 may perform an approximate operation on the input homomorphic encrypted messages. The approximate operation refers to an operation performed using an approximate expression that may obtain similar results, not an exact expression. The approximate operation may be applied not only to homomorphic encrypted messages for approximate messages but also to homomorphic encrypted messages for generic messages.

For the approximate operation, the computing device 200 calculates an approximate polynomial corresponding to an operation function to be applied. If the arithmetic function is a decryption function, the computing device 200 may calculate an approximate polynomial so that an absolute value of a difference from the arithmetic function is equal to or smaller than a threshold value. In this case, the plaintext space of the operation result encrypted message may be extended by the approximate operation.

In case of not an approximate polynomial corresponding to the decryption function, if a follow-up operation on the operation result encrypted message obtained by the approximate operation is to be performed, the weight of the approximate message in the operation result encrypted message may be compared with a threshold value and a plaintext space extending operation may be performed when the weight exceeds the threshold value.

Hereinafter, components and operations of each device will be described.

Figure 2:
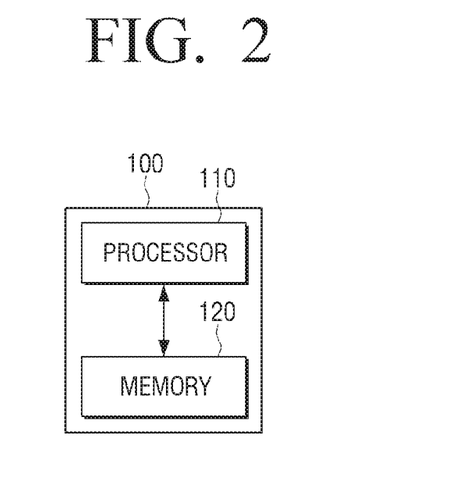
FIG. 2 is a block diagram illustrating components of an encryption device according to an embodiment of the disclosure.

FIG. 2 illustrates components of an encryption device according to an embodiment of the disclosure. In the system of FIG. 1, devices which perform homomorphic encryption like the first and second devices 100-1 and 100-2 may also be referred to as encryption devices alternatively.

According to FIG. 2, the encryption device 100 includes a processor 110 and a memory 120. FIG. 2 illustrates only the minimum components required for an encryption operation, and various other components may further be added depending on the type of the encryption device 100. For example, a communication interface, a display, an inputter, and the like, may further be included, but these components are not directly related to homomorphic encryption and thus illustration and description thereof are omitted.

When a message to be transmitted is input, the processor 110 stores the message in the memory 120. The processor 110 homomorphic-encrypts the message using various set values and programs stored in the memory 120. In this case, a public key may be used.

The processor 110 may generate by itself and use the public key required for performing encryption or may receive the public key from an external device and use the same. For example, the third device 100-3, which performs decryption, may distribute the public key to other devices.

In case of generating the key by itself, the processor 110 may generate the public key using the Ring-LWE technique. Specifically, the processor 110 may first set various parameters and rings and stores the set parameters and rings in the memory 120. Examples of the parameters may include a length of plaintext message bits, sizes of the public and secret keys, and so on.

The ring may be expressed by the following equation.

$$R = \mathbb{Z}_q[x]/(f(x)) \quad \text{[Equation 2]}$$

The ring refers to a set of polynomials having predetermined coefficients. For example, the ring refers to a set of nth-order polynomials in which a coefficient is Zq. In Equation 2, f(x) denotes an nth-order polynomial. Specifically, f(x) denotes Nth-order cyclotomic polynomial when n is $\Phi(N)$. f(x) denotes ideal of Zq[x] generated by f(x). An Euler totient function $\Phi(N)$ refers to the number of natural numbers that are relatively primes and smaller than N. When $\Phi_N(x)$ is defined as an Nth-order cyclotomic polynomial, the ring may also be expressed by the following equation.

$$R = \mathbb{Z}_q[x]/(\Phi_N(x)) \quad \text{[Equation 3]}$$

The secret key (sk) may be expressed as follows.

$$sk \leftarrow (1, s(x)), s(x) \in R \quad \text{[Equation 4]}$$

s (x) denotes a polynomial randomly generated with a small coefficient.

The processor 110 calculates a first random polynomial a(x) from the ring. The first random polynomial may be expressed as follows.

$$a(s) \leftarrow R \quad \text{[Equation 5]}$$

In addition, the processor 110 extracts an error from a discrete Gaussian distribution or a distribution close in statistical distance from the discrete Gaussian distribution. The error may be expressed by the following equation.

$$e(x) \leftarrow D_{\alpha q}^n \qquad \text{[Equation 6]}$$

When the error is calculated, the encryption device 100 may perform modular arithmetic on the first random polynomial and the secret key to produce a second random polynomial. The second random polynomial may be expressed as follows.

$$b(x) = -a(x)s(x) + e(x) \pmod{q} \qquad \text{[Equation 7]}$$

Finally, the public key pk is set in the form of including the first random polynomial and the second random polynomial as follows.

$$pk = (b(x), a(x)) \qquad \text{[Equation 8]}$$

The above-described key generating method is merely an example and the disclosure is not limited thereto. The public key and the secret key may be generated by other methods.

The processor 110 may store the generated homomorphic encrypted message in the memory 120 or may transmit the same to the computing device 200 according to a user request or a predetermined default command.

Figure 3:
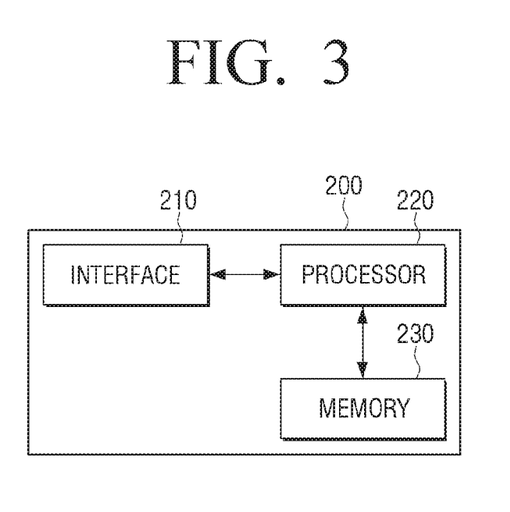
FIG. 3 is a block diagram illustrating components of a computing device according to an embodiment of the disclosure.

FIG. 3 is a block diagram illustrating components of the computing device 200 according to an embodiment of the disclosure. According to FIG. 3, the computing device 200 includes an interface 210, a processor 220, and a memory 230. As in FIG. 2, the computing device of FIG. 3 may further include various additional components, but illustration and description of parts which are irrelevant or not greatly related to the operation of the disclosure are omitted.

The interface 210 is a component for receiving or transmitting data and signals from or to various devices. Specifically, the interface 210 may be realized by various wired and wireless communication interfaces such as LAN, wireless LAN, Wi-Fi, Bluetooth, near-field communication (NFC), ZigBee, and the like.

When the homomorphic encrypted message for the approximate message including the error is input through the interface 210, the processor 220 stores the homomorphic encrypted message in the memory 230. Even when a homomorphic encrypted message for a generic message that does not contain an error is input, the processor 220 stores the same in the memory 230.

The memory 230 is a component for storing various programs and data as well as the homomorphic encrypted message.

The processor 220 performs an operation on the homomorphic encrypted messages according to a user request or a predetermined set value. In this case, decryption is not performed on the homomorphic encrypted messages. The types of operations may be set to be various. For example, if a multiplication value or an average value regarding two homomorphic encrypted messages is requested, the processor 220 may perform operations such as multiplying two specified homomorphic encrypted messages or multiplying the two specified homomorphic encrypted messages and dividing the two multiplied specified homomorphic encrypted messages by 2. Alternatively, the processor 220 may perform an approximate operation.

The processor 220 checks the weight of an approximate message in the operation result encrypted message obtained by the operation. The processor 220 extends a plaintext space of the operation result encrypted message if the weight of the approximate message exceeds a threshold value.

More specifically, the processor 220 may extend the plaintext space by applying a predetermined function to the operation result encrypted message. The processor 220 may use a function defined to obtain a quotient by dividing the encrypted input value by a predetermined threshold encrypted message modulus and eliminate the same. The threshold value may be set to any value suitable for encryption/decryption performance and stored in the memory 230. For example, the threshold value may be set to a weight when the operation result occupies the entire plaintext space, that is, 100%. In another example, the threshold value may be set to a value less than a limit value so that rebooting may be performed before occupying the entire plaintext space, i.e., for early rebooting. For example, a limit value of about 80 to 50% may be set. The limit value refers to a size of the plaintext space in which a follow-up operation on the operation result encrypted message is not possible.

Alternatively, the processor 220 may produce an approximate polynomial corresponding to the operation polynomial to be applied to the homomorphic encrypted message, and may operate the resultant encrypted message using the produced approximate polynomial to extend the plaintext space. In this case, if the operation polynomial is a decryption function, the approximate polynomial may be set such that an absolute value of a difference between the approximate polynomial and the operation polynomial is set to be equal to or less than the threshold value. For example, the decryption function may be set as follows.

$$Dec_{s(x)}(a(x), b(x)) = [b(x) - a(x)s(x)]_q = \sum_{i=0}^{n} [f_i]_q X^i \qquad \text{[Equation 9]}$$

The modulus operation included in the decryption function of Equation 9 may be approximately changed by the following method.

$$[f_i]_q = \frac{q}{2\pi} \sin\left(\frac{2\pi}{q} f_i\right) \simeq \qquad \text{[Equation 10]}$$

$$(f_i) - \left(\frac{2\pi}{q}\right)^2 (f_i)^3 / 3! + \left(\frac{2\pi}{q}\right)^4 (f_i)^5 / 5! = P(f_i)$$

In another example, the modulus operation may be calculated by a recursive method. In this case, the modulus operation may be expressed as follows:

$$[f_i]_q = \frac{q}{2\pi} \sin\left(\frac{2\pi}{q} f_i\right) \simeq \frac{q}{2\pi} S_k\left(\frac{2\pi}{q} f_i\right) \qquad \text{[Equation 11]}$$

In Equation (11), k is an arbitrary integer. K may vary depending on accuracy of calculation or characteristics of parameters.

Sk in Equation (11) may be calculated using the following four equations.

[Equation 12]

$$S_0(x/2^k) = (x/2^k) - (x/2^k)^3/3! + (x/2^k)^5/5! \qquad (1)$$

$$C_0(x/2^k) = 1 - (x/2^k)^2/2! + (x/2^k)^4/4! \qquad (2)$$

$$S_i(x/2^{k-i}) = 2 \cdot C_{i-1}(x/2^{k-i+1}) \cdot S_{i-1}(x/2^{k-i+1}) \qquad (3)$$

$$C_i(x/2^{k-i}) = C_{i-1}^2(x/2^{k-i+1}) - S_{i-1}^2(x/2^{k-i+1}) \qquad (4)$$

Here, Sk refers to an approximate polynomial expression when the arithmetic function is a Sin function as in Equation 11.

In addition, the processor 220 may store in the memory 230 additional information to be used when the operation result encrypted message is later decoded. The additional information may include a position of an operation result message in the operation result encrypted message, the modulus value used for the extension of the plaintext space, and the like.

The processor 220 may provide the operation result encrypted message and the additional information for the device requesting the operation result through the interface 210.

Figure 4:
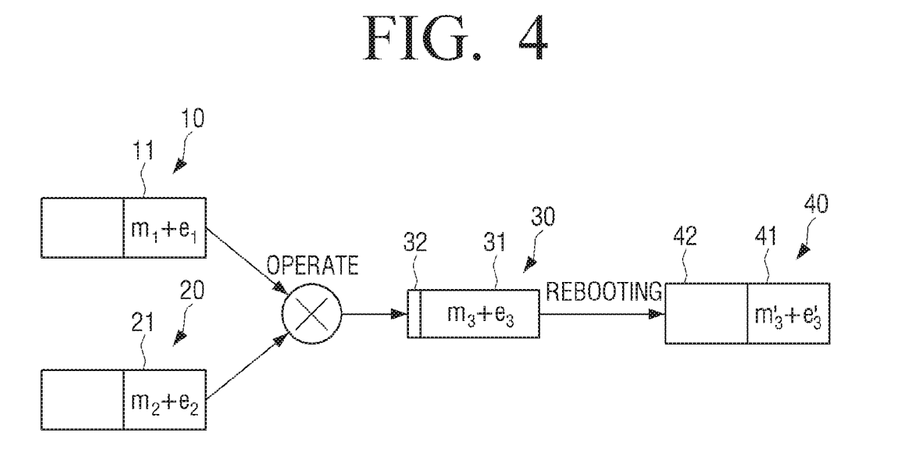
FIG. 4 is a view illustrating an operation of the computing device.

FIG. 4 is a diagram specifically illustrating an operation of the computing device. In FIG. 4, an operation and rebooting process of two homomorphic encrypted messages 10 and 20 are illustrated.

The homomorphic encrypted message 10, 20 include approximate message regions 11, 21, respectively. The approximate message regions 11 and 21 include messages and errors m1+e1 and m2+e2) together, respectively.

The computing device performs a specific operation using the two homomorphic encrypted messages 10 and 20 as input values. An operation result encrypted message 30 includes an approximate message region 31 containing an operation result m3+e3 between the approximate messages. As the operation result is larger than the input values, the approximate message region is increased and a remaining plaintext space 32 is reduced. When these operations are performed several times, the remaining plaintext space 32 eventually disappears or reduced to be smaller than a limit value, and thus, the operation is impossible. When this state is determined, the computing device 200 performs rebooting.

It can be seen that a rebooted encrypted message 40 has extended plaintext space 42 and a reduced approximate message region 41. There is a slight difference between the approximate message m3+e3 in the encrypted message prior to rebooting and the approximate message m3'+e3' in the encrypted message after rebooting but the difference in error size so small that there is no significant difference from the original message. In case of the related art encryption/decryption mechanism, data after decryption is designed to be the same as the original plain text, but according to this embodiment, an approximate message, instead of exactly the same plain text, is output. As a result, because an error required for safety and an error caused through effective numerical operation are treated as one noise, it is possible to perform a real number operation in an encrypted state, and efficiency of encryption/decryption may be increased.

Figure 5:
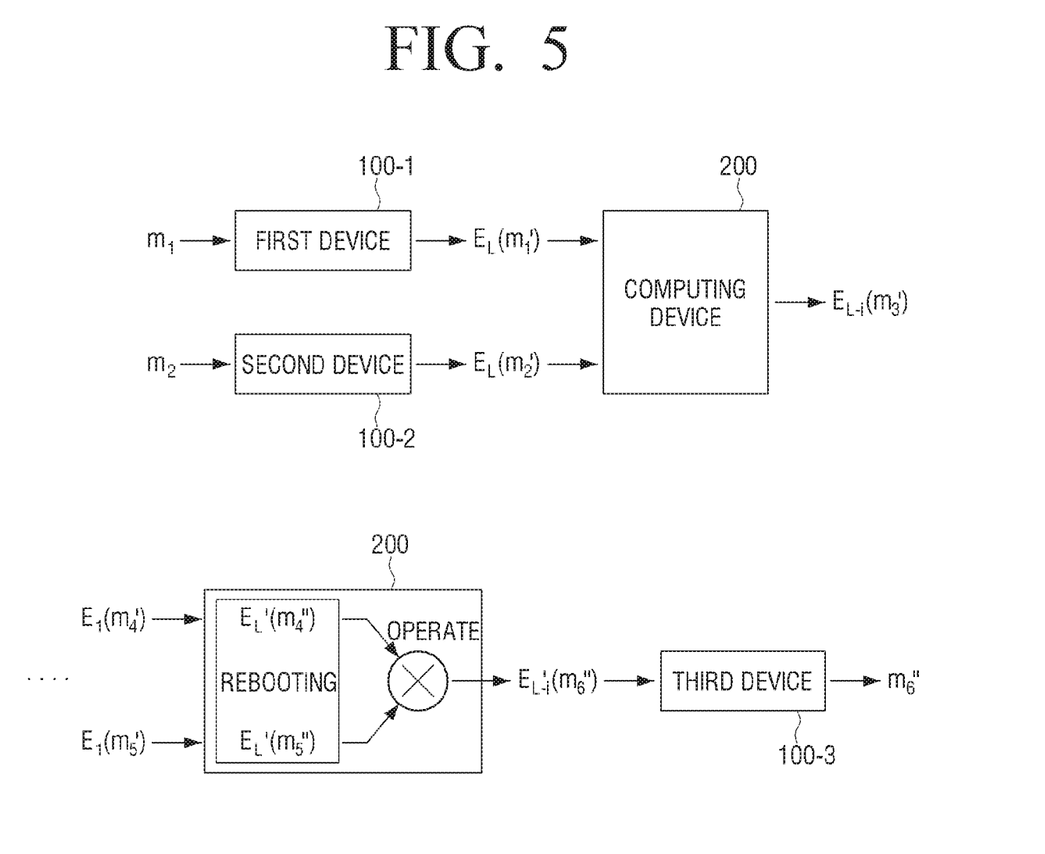
FIG. 5 is a view illustrating an operation of the data processing system of FIG. 1.

FIG. 5 is a diagram illustrating a data processing method according to an embodiment of the disclosure. According to FIG. 5, the first device 100-1 and the second device 100-2 homomorphic-encrypt messages m1 and m2 and output the homomorphic encrypted messages $E_L(m_1')$ and $E_L(m_2')$, respectively. The computing device 200 performs an operation on the homomorphic encrypted messages $E_L(m_1')$ and $E_L(m_2')$ and outputs an operation result encrypted message $E_L-i(m_3')$. Here, L denotes a modulus level of the encrypted message. As the operation is repeated, the modulus level is continuously decreased. For example, if a depth of an operation desired to be performed in the encrypted state by the computing device 200 is i, the modulus level is reduced by i. Thus, if the modulus level falls below a threshold, further operations on the homomorphic encrypted messages is impossible.

In FIG. 5, the threshold value is set to level 1. Thus, it can be seen that the level 1 homomorphic encrypted messages $E_1(m4')$ and $E_1(m5')$ is not operable.

The computing device 200 reboots $E_1(m4')$ and $E_1(m5')$ to generate $E_{L'}(m4'')$ and $E_{L'}(m5'')$, respectively. By rebooting, the modulus level is level L' almost similar to L, and the approximate messages also change to m4'' and m5'' which are almost similar to m4' and m5', respectively.

The computing device 200 operates the rebooted encrypted messages and provides an operation result encrypted message $E_{L'\_i}(m6'')$ to the third device 100-3. The finally operated operation result encrypted message may be expressed by the following Equation.

$$Ctxt = (v \cdot b(x) + m6'' + e_{4'''} v \cdot a(x) + e_{5''}) \in R \times R \qquad [\text{Equation 13}]$$

The third device 100-3 decrypts the operation result encrypted message to obtain an approximate message m6''.

The third device 100-3 may use additional information for decryption. As described above, the additional information may include a scaling factor, a modulus value of an operation result encrypted message, and the like.

If the modulus value is Δ', the decrypted approximate message may be m6''/Δ'. Thus, although the real plain text is integerized during the encryption process, the integerized plain text may be recovered to a real number during decryption. Also, the modulus value in the additional information may be used as a modulus of the ring R in Equation 9.

The third device 100-3 may finally acquire m6'' through decryption.

Figure 6:
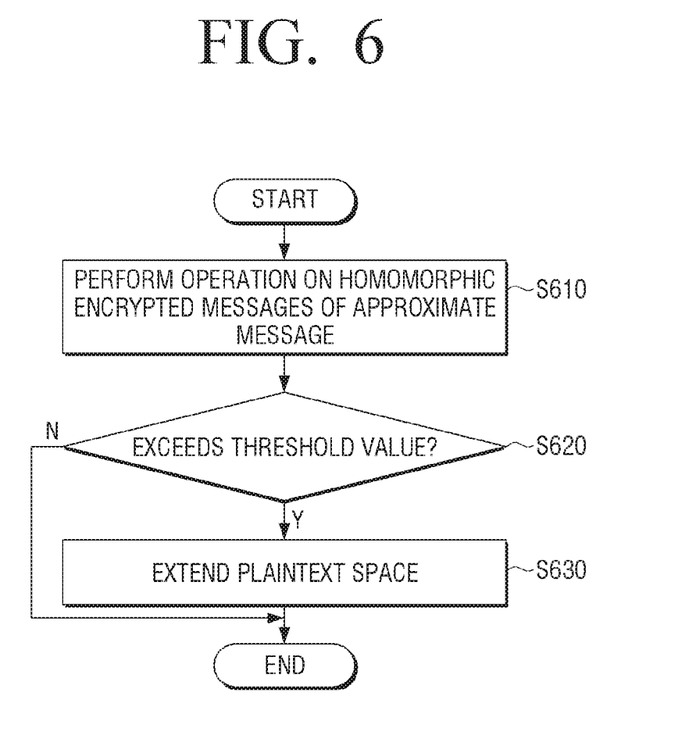
FIG. 6 is a flowchart illustrating a method of processing a homomorphic encrypted message according to an embodiment of the disclosure.

FIG. 6 is a flowchart illustrating a method of processing a homomorphic encrypted message according to an embodiment of the disclosure. Referring to FIG. 6, when homomorphic encrypted messages of an approximate message are input and a request for operating the encrypted messages is input, the requested operation is performed in operation S610. For example, the operation may be set to basic operation such as multiplication, division, addition, subtraction, and the like, but is not limited thereto. Specifically, if the encrypted message is a complex number, a conjugate operation may be performed, and operations such as statistics and sorting may also be performed.

The computing device may determine whether the weight of the approximate message in the homomorphic encrypted message exceeds a threshold value before or after the operation in operation S620. In FIG. 6, the operation is performed after the operation but the disclosure is not limited thereto. If it is determined that the weight of the approximate message exceeds the threshold value as a result of the determination, the computing device performs rebooting to extend the plaintext space in operation S630. Thus, the operation may be efficiently and repeatedly performed.

The computing device may further perform an operation of providing additional information to be used for decrypting the operation result encrypted message.

In addition, as described above, the computing device may replace the operation itself with an approximate operation. In this case, the computing device may sequentially perform an operation of producing an approximate polynomial corresponding to an operation function to be applied to the homomorphic encrypted message and an operation of approximating the homomorphic encrypted message using the operated approximate polynomial. Here, the approximate polynomial may be produced such that an absolute value of a difference from the operation function is equal to or smaller than the threshold value in case that the operation function is a decryption function. When the approximate operation is performed using the approximate polynomial, the plaintext space of the operation result encrypted message may be extended.

In other cases, when a follow-up operation is performed on the operation result encrypted message acquired by the approximate operation, the plaintext space may be extended if the weight of the approximate message exceeds the threshold value. Because the method of extending the plaintext space has been described in detail in the above-mentioned section, a redundant description thereof will be omitted.

Various embodiments have been described above with reference to flowcharts and block diagrams. The order of the steps illustrated in each flowchart is only an example and may be changed according to situations. Also, some steps may be omitted or added according to embodiments.

Also, the encryption method, the processing method, the decryption method, the rebooting method, the operation method, and the like, according to various embodiments as described above may be stored in the form of a program code for performing the method in a recording medium. In this case, a device equipped with the recording medium may perform the operations according to the various embodiments described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. A method for processing a homomorphic ciphertext performed by a computing apparatus, the method comprising:
   producing an approximate polynomial corresponding to an operation function to be applied to a homomorphic ciphertext;
   processing an approximately operation for the homomorphic ciphertext using the approximate polynomial; and
   extending a plaintext space of the processed homomorphic ciphertext when the weight of an approximate message in the processed homomorphic ciphertext exceeds a threshold value, wherein
   the extending of the plaintext space comprises extending the plaintext space by applying a function defined to obtain a quotient by dividing an encrypted input value by a predetermined threshold ciphertext modulus and eliminating the quotient, to the processed homomorphic ciphertext.

2. The method as claimed in claim 1, wherein the producing of the approximate polynomial comprises, when the operation function is a complex function, calculating the approximate polynomial such that an absolute value of a difference from the operation function is equal to or smaller than a threshold value.

3. The method as claimed in claim 1, wherein the threshold value is set to a value less than a limit value for early rebooting, and the limit value has a size of the plaintext space in which a follow-up operation on the processed homomorphic ciphertext is not possible.

4. The method as claimed in claim 1, further comprising:
   providing additional information to be used for decryption of the processed homomorphic ciphertext,
   wherein the additional information includes a scaling factor and a modulus value of the processed homomorphic ciphertext.

5. A computing device comprising:
   an interface configured to receive homomorphic ciphertext;
   a memory configured to store the homomorphic ciphertext; and
   a processor configured to produce an approximate polynomial corresponding to an operation function to be applied to the homomorphic ciphertext and to process an approximately operate for the homomorphic ciphertext using the produced approximate polynomial, wherein
   the processor extends a plaintext space of the processed homomorphic ciphertext, when the weight of the approximate message in the processed homomorphic ciphertext exceeds a threshold value, and
   the processor extends the plaintext space by applying a function defined to obtain a quotient by dividing an encrypted input value by a predetermined threshold ciphertext modulus and eliminating the quotient, to the processed homomorphic ciphertext.

6. The computing device as claimed in claim 5, wherein the processor, when the operation function is a complex function, produces the approximate polynomial such that an absolute value of a difference between the approximate polynomial and the operation function is equal to or smaller than a threshold value.

7. The computing device as claimed in claim 5, wherein the threshold value is set to a value less than a limit value for early rebooting and stored in the memory, and
   wherein the limit value has a size of the plaintext space in which a follow-up operation on the processed homomorphic ciphertext is not possible.

8. The computing device as claimed in claim 5, wherein the processor stores additional information to be used for decryption of the processed homomorphic ciphertext in the memory, and
   wherein the additional information includes a scaling factor and a modulus value of the processed homomorphic ciphertext.

* * * * *